Figure 1:
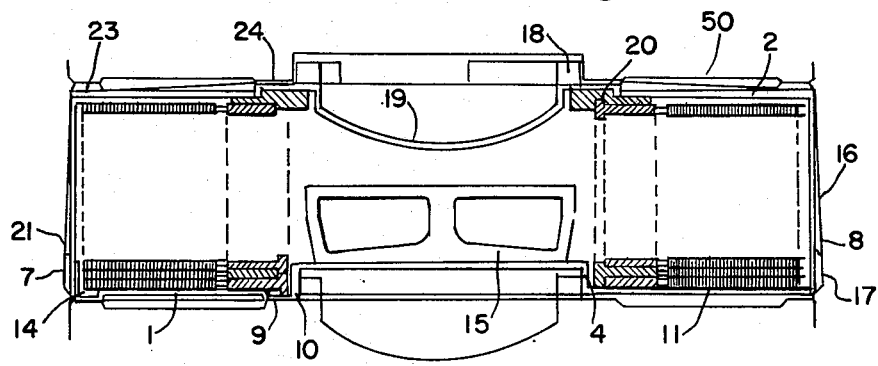

United States Patent [19]

Huber et al.

[11] Patent Number: 4,457,429
[45] Date of Patent: Jul. 3, 1984

[54] PACKAGE FOR RECORDING MEDIA

[75] Inventors: Manfred Huber, Oberkirch; Robert Schindler, Baden-Baden, both of Fed. Rep. of Germany

[73] Assignee: BASF Aktiengesellschaft, Ludwigshafen, Fed. Rep. of Germany

[21] Appl. No.: 352,859

[22] Filed: Feb. 26, 1982

[30] Foreign Application Priority Data

Mar. 31, 1981 [DE] Fed. Rep. of Germany ... 8109502[U]

[51] Int. Cl.³ .......................................... B65D 85/672
[52] U.S. Cl. .................................. 206/394; 206/403; 206/408; 206/444; 206/445; 220/4 B
[58] Field of Search ............... 206/308, 309, 389, 398, 206/402, 403, 404, 405, 406, 408, 444, 445, 509, 394; 220/4 B, 4 E

[56] References Cited

U.S. PATENT DOCUMENTS

| | | | |
|---|---|---|---|
| 2,481,095 | 9/1949 | Essman | 206/403 |
| 2,627,991 | 2/1953 | Maersch | 220/4 E |
| 2,631,725 | 3/1953 | Miller | 206/403 |
| 2,859,868 | 11/1958 | Jaworski et al. | 206/405 |
| 3,212,729 | 10/1965 | Putnam | 206/403 |
| 3,280,987 | 10/1966 | Steinbock | 206/408 |
| 3,322,262 | 5/1967 | Puente | 206/509 |
| 3,339,718 | 9/1967 | Geier | 206/406 |
| 3,369,654 | 2/1968 | Burgess | 206/406 |
| 3,612,233 | 10/1971 | Nagpal | 206/408 |
| 3,620,475 | 11/1971 | Penn | 206/404 |
| 3,685,646 | 8/1972 | Sy | 206/408 |
| 4,162,031 | 7/1979 | Summersby | 206/403 |
| 4,195,733 | 4/1980 | Abel . | |

FOREIGN PATENT DOCUMENTS

| | | |
|---|---|---|
| 8034894 | 6/1961 | Fed. Rep. of Germany . |
| 8034894 | 7/1981 | Fed. Rep. of Germany . |
| 2110653 | 8/1972 | France . |

Primary Examiner—George E. Lowrance
Assistant Examiner—Jimmy G. Foster
Attorney, Agent, or Firm—Keil & Weinkauf

[57] ABSTRACT

A package for a plurality of stacked rolls or reels of recording media in tape form is provided with central holding means for the rolls or reels, and consists of a bottom member and a cover member which together have the shape of a cylindrical cheesebox, the cover member having a handle for carrying the closed container, and the bottom member having a handle for carrying it with or without tape rolls or reels. The cover member and bottom member may be provided externally with matching projections and depressions to enable a plurality of packages to be stacked in a virtually gap-free and interlocking manner.

4 Claims, 6 Drawing Figures

PACKAGE FOR RECORDING MEDIA

The present invention relates to a package for a plurality of stacked rolls of recording media in tape form wound on annular hubs or flanged reels, the package consisting of at least two parts, namely a bottom member and a cover member, whose inside diameter is somewhat larger than the diameter of the fully wound hubs or reels, and being provided with central holding means for at least one of the hubs or flanged reels.

For the purposes of the present invention, recording media include all types of recording media of ribbon-like configuration which can be wound into a roll, for example motion picture films, and in particular magnetic recording media, such as magnetic films and magnetic tapes.

Magnetic tapes are marketed wound on flangeless hubs or flanged reels according to DIN 45,517. The hubs or reels are flat on either side and can therefore only be locked together by additional locking means when they are stacked. The tape reels are as a rule shipped in a cardboard box in trough-shaped plastic containers. This packaging is uneconomical and awkward to handle. Such trough-shaped containers made of polystyrene foam or some other similar foam material are bulky and hence not easy to dispose of.

German Laid-Open Application DOS No. 2,655,254 has disclosed a package for a stack of flangeless tape reels, which package consists of a pair of flat pallets and a shrink film sleeve. However, this is only a one-trip package which moreover effectively protects only the upper and lower surfaces of the stack from damage, but not its peripheral surface. Furthermore, special hubs with interlocking members have to be employed to prevent the tape reels from slipping sideways.

British Pat. No. 1,372,231 relates to a container for a stack of tape rolls wound on individual single-flanged reels, in which means are provided for exerting pressure axially on the reels to hold them together.

In the field of magnetic disc packs, U.S. Pat. No. 3,509,992 discloses a generally cylindrical container for a stack of magnetic discs fixedly mounted in spaced parallel relationship, a handle being provided in a cavity in the upper container section. This handle is used for carrying the closed container, placing it on the memory processing unit, securing the lower container section with the disc pack to the drive means of the memory processing unit, and removing the upper container section.

The weight of a "pancake" usually used in the production of compact cassettes is about 0.6 kg, and hence a stack of such "pancakes" generally weights from about 9 to 12 kg.

It is an object of the present invention to provide a package which can be used repeatedly for safely storing and shipping rolls or reels of recording media, especially "pancakes", which is easy to handle and which protects the rolls or reels from dust and other environmental influences.

We have found that this object is achieved with a package for a plurality of stacked rolls of recording media in tape form wound on annular hubs or flanged reels, the package consisting of at least two parts, i.e. a bottom member and a cover member, whose inside diameter is somewhat larger than the diameter of the fully wound hubs or reels, and being provided with central holding means for at least one of the hubs or flanged reels, if the cover member is optionally provided with a handle for carrying the closed package, and the bottom member is provided with a handle for carrying it with or without the rolls or reels of recording media.

Trouble-free handling of the closed container and of the opened container, either in the full or empty state, is thus achieved.

In further embodiments of the novel package, the bottom and cover members together have the shape of a cylindrical cheesebox, the cover having the shape of a cylindrical hood.

Advantageously, the central holding means for the reels or hubs are in the form of an upwardly extending, hollow projection on the bottom member, and an inwardly extending, hollow projection on the cover member. As a result, each member can easily be produced in one piece by deep drawing or injection molding.

In a further advantageous embodiment, the hollow projections are each provided with a handle which can be manufactured at the same time as the member concerned.

In a practical embodiment, the cover and bottom members are provided on the outside with projections which engage matching depressions in adjacent packages, thus enabling a plurality of the packages to be stacked in nesting relationship.

In yet another advantageous embodiment, an annular recess is provided around the cylindrical projection on the bottom member, to accommodate projections on the hubs or reels, so that the lowermost tape roll lies flat on the bottom member and consequently all the other rolls in the stack lie parallel thereto, which imparts stability to the stack.

In another embodiment, recesses are provided on the outside of the cover and bottom members for straps, reliable closure of the full package thus being ensured.

In a further practical embodiment, one or more resilient members are arranged around the inwardly extending, hollow projection on the cover member, which exert pressure axially on the hubs or reels and thus substantially prevent radial slippage thereof.

Figure 2:
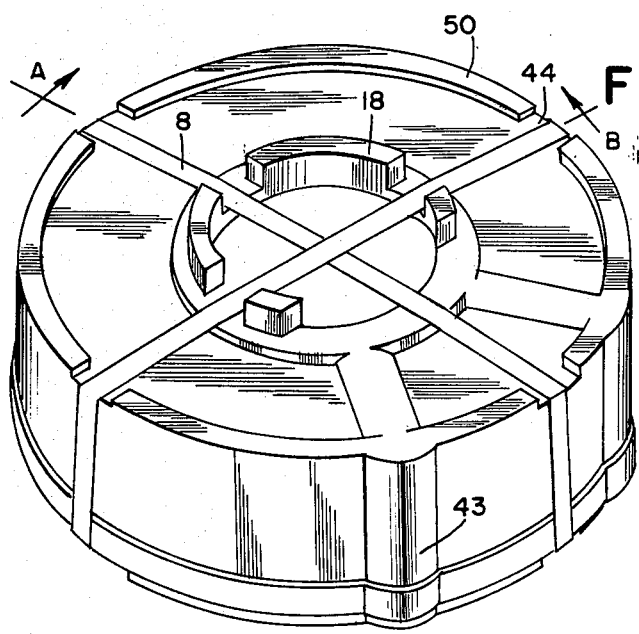
Figure 3:
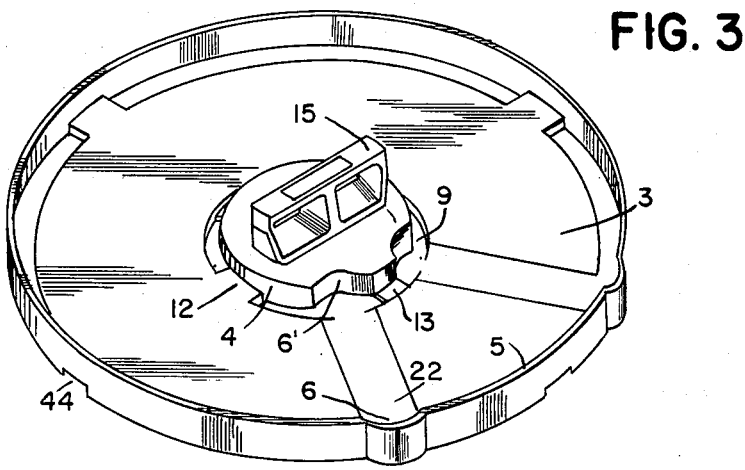
Figure 4:
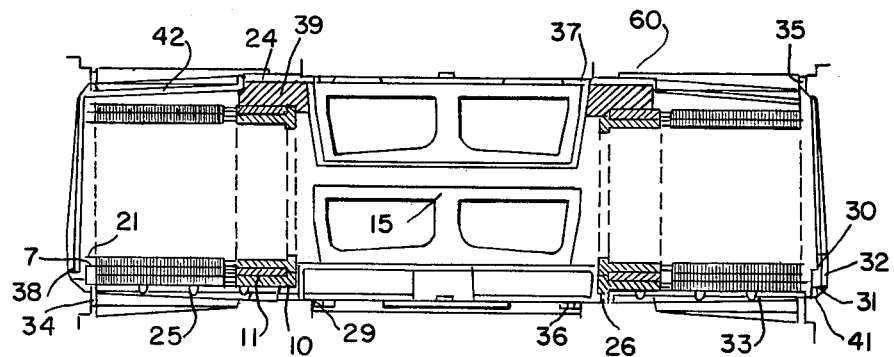
Figure 5:
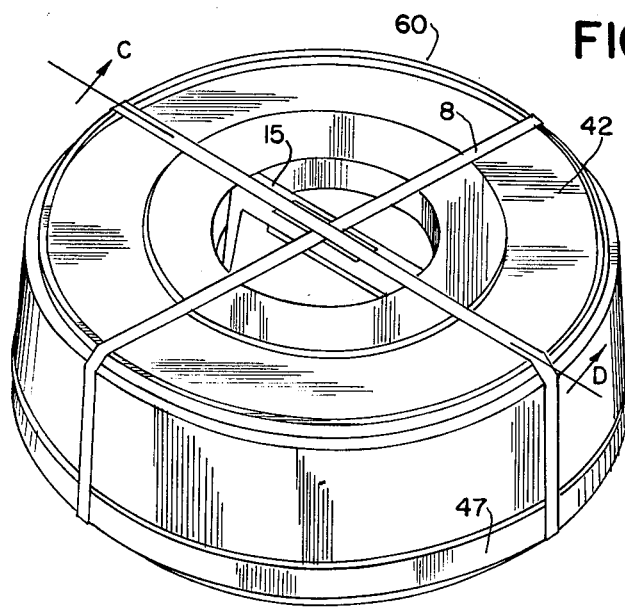
Figure 6:
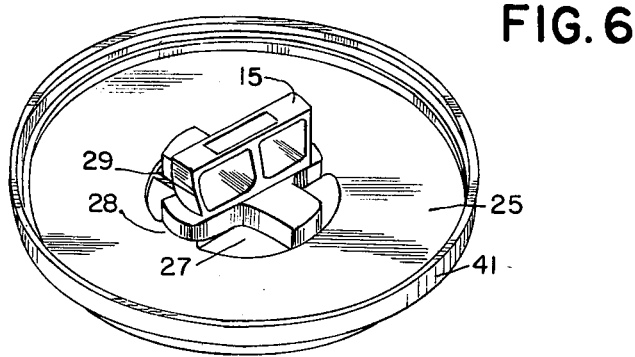

Further details of the invention are disclosed below with reference to the embodiments illustrated in the accompanying drawings, in which FIG. 1 shows a cross-section along line A-B of FIG. 2 through a first embodiment of a package according to the invention, containing tape rolls wound on flangeless annular reels, FIG. 2 shows a perspective view of the outside of the novel package, FIG. 3 shows the bottom member of the novel package in perspective view, FIG. 4 shows a cross-section along the line C-D of FIG. 5, through a second embodiment of a novel package, also containing tape rolls wound on flangeless annular reels, FIG. 5 shows a perspective view of the outside of the novel package, and FIG. 6 shows the bottom member of the package of FIGS. 4 and 5 in perspective view.

The two embodiments shown in the drawings are intended for the storage and transportation of rolls of magnetic tape, the width of which is very small compared with the diameter of the tape roll.

Referring to FIG. 1, the package 50 according to the invention consists of a substantially flat bottom 1 and a cover 2 in the form of a cylindrical hood, the two parts being connectable in an essentially air-tight manner. The shapes of the bottom 1 and the cover 2 can of course also be reversed. It is essential that the parts, regardless of their shape, should be sufficiently strong to support the weight of the enclosed stack of tape rolls, and to allow the bottom container in a stack of containers to bear the weight of the containers thereabove.

As a result of the almost air-tight connection between the bottom 1 and cover 2 and their sturdy construction, the rolls of recording media are enclosed on all sides and protected from dust, moisture, heat and mechanical damage during handling and transportation. Because deep drawing and injection molding are cheap methods of manufacture, the package 50 (60 - cf. FIG. 4) preferably consists of a plastics materials, such as polystyrene, ABS resin or rigid PVC, which can be processed by these methods.

All materials, such as paper, cardboard and expanded polystyrene, which are not abrasion-resistant and hence from which undesirable particles can become detached during handling, are unsuitable as materials of construction.

Package 50 is preferably produced by deep drawing. Its bottom 1 consists of a substantially flat plate-shaped member 3 with a central, upwardly extending, hollow cylindrical projection 4, the outside diameter of which is somewhat smaller than the inside diameter of the hubs 11, thus ensuring simple insertion and removal of the lowermost hubs, and of an upwardly extending annular flange 5 (cf. FIG. 3).

The annular hubs 11 shown are essentially symmetrical in shape with respect to the horizontal plane, which makes them stackable and radially self-locking. Upwardly and downwardly extending projections 10 engage matching recesses in adjacent hubs 11, a stack thus being formed which is secured axially and radially. In the case of the novel package under discussion, such an expensive hub does not have to be employed. Any type of hub, such as NARTB hubs according to DIN 45,517 and dish-shaped hubs, can be used with such a container.

The projections 10 on the lower surface of the bottom annular hub 11 enter a groove 9 surrounding the cylindrical projection 4, so that the roll of tape wound thereon lies flat on a previously inserted annular slip sheet 21. These slip sheets 21 are made of any suitable material of the appropriate thickness and are also placed between the tape rolls 7 and on the upper surface of the top roll, to protect the tape rolls and in particular to prevent the tape edges of adjacent rolls from making contact and rubbing against each other. The lower portion 17 of the cylindrical lateral wall 16 of the cover 2 fits over the annular flange 5 on bottom 1, to form a dust-light seal.

At least one outwardly extending excess 6 is provided in the annular flange 5 on the bottom 1, which cooperates with a matching bowed projection 43 on the cover 2 when the container 50 is closed. As shown in FIG. 3, a recess 6' is provided in the cylindrical projection 4, opposite the outwardly extending recess 6, the two recesses 6 and 6' being connected to one another via a radial, trough-shaped depression 22. Recesses 6 and 6' serve as finger spaces which facilitate insertion and removal of the tape reels. In the present embodiment, two outwardly extending recesses 6 are provided which, when the container is closed, mate with projections 43 and thus prevent rotation of the bottom 1 and cover 2 relative to one another and hence damage to the tape rolls. As shown in FIG. 3, the annular groove 9 may be interrupted by radial webs 12 and 13 which fit in the gaps between the downwardly extending projections 10 on the bottom annular hub 11 and thus prevent rotation thereof. The webs 13 may be of at least such a height that the distance between the upper surface of the web and the flat surface of the plate-shaped member 3 corresponds to the height of the downwardly extending projections on the hub 11. The outer annular groove 14 in the bottom 1 can also be interrupted by webs formed by the recesses 44 for accommodating the straps 8.

Cover 2 has an inner annular projection 24 and an outer annular projection 23 which may be recessed at 90° intervals. Cover 2 also has a central hollow projection 19 which extends inwardly from the peripheral edge of the inner annular projection 24, and may be of the same diameter as the cylindrical projection 4 on the bottom 1. A handle 15 is advantageously provided on the upper surface of the cylindrical projection 4, being appropriately fastened thereto; this handle enables the stack of tape rolls on the bottom 1 to be carried and handled without difficulty, without it being necessary to use the cover 2. A similar handle 15 may also be provided within the cavity in the hollow projection 19 on the cover 2 if the closed container cannot be carried by means of the closure straps 8 spanning the said cavity. Locking projections 18 may be provided, around the cavity, on the inner annular projection 24 which fit in the recess, formed by the cylindrical projection 4, of the container 50 immediately thereabove, so that radial slippage of containers 50 relative to one another when they are stacked is prevented or at least made more difficult. The inside height of the container 50 is dependent on the respective shapes and dimensions of the bottom 1 and cover 2, and determines the number of tape rolls 7 that can be accommodated and hence transported therein. A rattleproof design can be achieved by arranging in the recess formed by the inner annular projection 24 a resilient ring 20 made of, for example, elastomeric material which presses on the uppermost hub 11 in the stack when the container is closed, thereby compensating for tolerances and holding the stack together in the axial direction. The resilient ring 20 can of course be replaced by individual springy members which are arranged in the recess symmetrically with respect to the center of the cavity in the hollow projection 19.

The above-described package 50 is so shaped that it can be manufactured advantageously by deep drawing, but it can also be injection-molded.

FIGS. 4 to 6 show a package 60 which can be manufactured advantageously by injection molding. The same parts bear the same reference numerals.

Referring to FIG. 4, the novel package 60 consists of a bottom 41 and a cover 42, its outer, slightly conical shape being similar to that of package 50 described above. The bottom 41 consists of a substantially flat plate-shaped member 25 whose flat annular portion is larger than that of bottom 1 of the foregoing embodiment, and of a central, generally cross-shaped, integrally molded projection 26 which secures the stack of tape rolls 7 against radial slippage. The length of the bars of the cross-shaped projection 26 is somewhat smaller than the inside diameter of the hubs 11. To accommodate the downwardly extending projection 10 on the bottom hub 11 if interlocking hubs with upwardly and downwardly extending projections are used, grooves 29 are provided in the plate-shaped member 25 adjacent to the opposite ends of one of the bars, the depth of the grooves being the same as, or greater than, the length of the projections 10 on the hub 11. Webs 28 which prevent rotation of the bottom hub 11 and hence of a stack of such interlocking hubs are formed at the opposite ends of the other bar of the cross-shaped projection 26 as a result of these ends merging into the flat annular portion of the plate-shaped member 25. Depressions 27 are provided in member 25 between adjacent pairs of legs of the cross-shaped projection 26 to facilitate insertion and removal of the lowermost tape reels 7; the depressions 27 also accommodate the downardly extending projections on the bottom hub 11. To facilitate carrying of the bottom 41 with a stack of tape rolls, a handle 15 is provided on the upper surface of the cross-shaped projection 26 in a suitable manner, for example by molding it integrally with the projection. The bottom 41 has an upwardly extending, step-shaped, annular flange 30 having a groove 31 for accommodating a sealing ring 32. The lower surface of the bottom 41 may be provided with radially extending or annular reinforcing ribs 33. The downwardly extending, annular support 34 is higher than the ribs 33 and rests upon an annular projection 35 on the cover of the container immediately therebelow. An annular projection 36 is provided in the middle of lower surface of the bottom 41, below the projection 26, which annular projection snugly fits in the cavity in the central hollow projection 37 on the cover 42 to prevent mutual radial slippage in a stack of containers 60. Annular support 34 and annular projection 36 may be provided with cut-outs for accommodating closure straps 8. In this particular embodiment no recesses for the closure straps 8 are provided on the cover 42.

When the container 60 is closed, the rim 38 of the cover 42 engages the sealing ring 32, so that a virtually hermetic seal is formed between the bottom 41 and the cover 42. The cover 42 has a central, inwardly extending, hollow projection 37 whose maximum outer diameter roughly corresponds to the length of the bars ofthe cross-shaped projection 26. Advantageously, a handle 15 for carrying the closed container 60 with or without its contents is integrally molded, or fastened in another suitble manner, inside the cavity in the hollow projectin 37. Here again, a resilient ring 39 or symmetrically arranged springy members may be provided in the recess formed by the inner annular projection 24, to compensate for tolerances and to hold the stack together in the axial direction. Annular slip sheets 21 of abrasion-resistant material of the appropriate thickness are advantageously placed on the upper surface of the bottom 41, between adjacent tape rolls 7 and on the upper surface of the top roll.

FIGS. 1 and 4 also show the upper and lower surfaces respectively of the adjacent containers in a stack.

In principle, it is possible to adapt each of the foregoing packages 50 and 60 to suit any kind of reelable recording media and any size of tape roll. Each of the packages has the following advantages:

(a) The stack of tape rolls in the package is prevented from rotating and slipping sideways.

(b) The package can be adapted to carry a maximum weight and to support the weight of a maximum number of similar packages stacked thereon.

(c) The package in the opened or closed state, with or without its contents, is easy to carry and handle.

(d) The rolls of tape are easy to insert into, and to remove from, the package.

(e) Since the lowermost tape roll lies flat on the bottom, the lateral surfaces of all the other rolls in the stack are parallel to one another, adjacent pairs of rolls being separated from one another by slip sheets which under normal circumstances prevent contact between the rolls.

The invention thus provides a novel package which can be manufactured in a simple manner and is suitable for continuous or repeated use.

We claim:

1. A package for a plurality of stacked rolls of recording media in tape form wound on annular flangeless hubs or flanged reels, the package being provided with central holding means for at least one of the hubs or flanged reels and comprising a bottom member and a cover member whose inside diameter is somewhat larger than the outer diameter of the fully wound hubs or reels, said members being designed to be releasably connected together, and said members together having the shape of a cylindrical cheesebox, the bottom member being substantially flat and having, as said central holding means, a substantially cylindrical projection extending inwardly into the interior of said package, finger spaces being provided between the circumference of said substantially cylindrical projection on the bottom member and the inner perimeter of the annular hubs or reels, for insertion and removal of the tape-carrying hubs or reels without touching the tape, the cover member having the shape of a cylindrical hood with a central hollow projection extending inwardly into the interior of said package in coaxial relationship with respect to the substantially cylindrical projection on the bottom member.

a first handle being provided on and within the confines of said hollow projection of said cover member, said handle having a carrying portion dimensioned so that, upon insertion of the fingers of the user into said hollow projection, the entire closed package with the plurality of rolls of recording media therein may be carried thereby, and a second handle being provided on said central projection on the bottom member for carrying the bottom member with or without rolls of recording media, said second handle extending inwardly and hence in the same direction as said substantially cylindrical projection of said bottom member.

2. A package as claimed in claim 1, wherein, to permit stacking of a plurality of packages, at least one projection is molded integrally with the bottom member on the bottom side thereof, said projection fitting in the central, inwardly extending, hollow projection on the cover member.

3. A package as claimed in claim 1, wherein a plurality of recesses are provided around the substantially cylindrical projection on the bottom member, to accommodate projections on the hubs or reels.

4. A package as claimed in claim 1, wherein recesses for closure straps are provided on the outside of the cover and bottom members.

* * * * *